United States Patent [19]
Krejcir et al.

[11] 4,014,533
[45] Mar. 29, 1977

[54] RESILIENT LOAD-BEARING SUPPORT FOR A VEHICLE

[75] Inventors: Oldrich Krejcir; Miroslav Bures; Alois Jerábek, all of Liberec, Czechoslovakia

[73] Assignee: Vysoka skola strojni a textilni, Liberec, Czechoslovakia

[22] Filed: July 11, 1975

[21] Appl. No.: 595,180

[52] U.S. Cl. .................................. 267/120; 248/20; 267/65 R; 267/65 B
[51] Int. Cl.² .......................................... F16F 5/00
[58] Field of Search ......... 267/120, 118, 113, 65 B, 267/65 R; 248/20, 22; 105/199 R, 197 D; 280/136, 439, 440

[56] References Cited
UNITED STATES PATENTS

| 2,961,033 | 11/1960 | Galbraith | 267/65 B |
| 3,281,101 | 10/1966 | May | 248/20 |
| 3,459,395 | 8/1969 | Scotto | 267/120 |
| 3,589,655 | 6/1971 | Hackbarth et al. | 248/20 |
| 3,626,864 | 12/1971 | Wiebe | 267/120 |

*Primary Examiner*—James B. Marbert

[57] ABSTRACT

An improved vehicle-mounted support for isolating delicate loads from shocks and other disturbances imparted to the vehicle floor during movement thereof over rough terrain is described. A plurality of adjustable pneumatic springs are disposed in each corner of a load-bearing stiff frame for interconnecting the frame to the carrier floor. A steel rope or other flexible strand extends between the spring-supported frame and the vehicle floor for limiting vertical displacement of the frame, while a separate pivotal connection mounts the spring-supported frame for oscillation with respect to the vehicle floor in a plane perpendicular to the plane of travel of the vehicle. Additional resilient support blocks maintain a desired minimum spacing between the bottom of the frame and the vehicle floor, and a plurality of adjustable resilient rods or standards may be preset on the frame independent of the springs to maintain a desired, initially set orientation of the frame.

10 Claims, 6 Drawing Figures

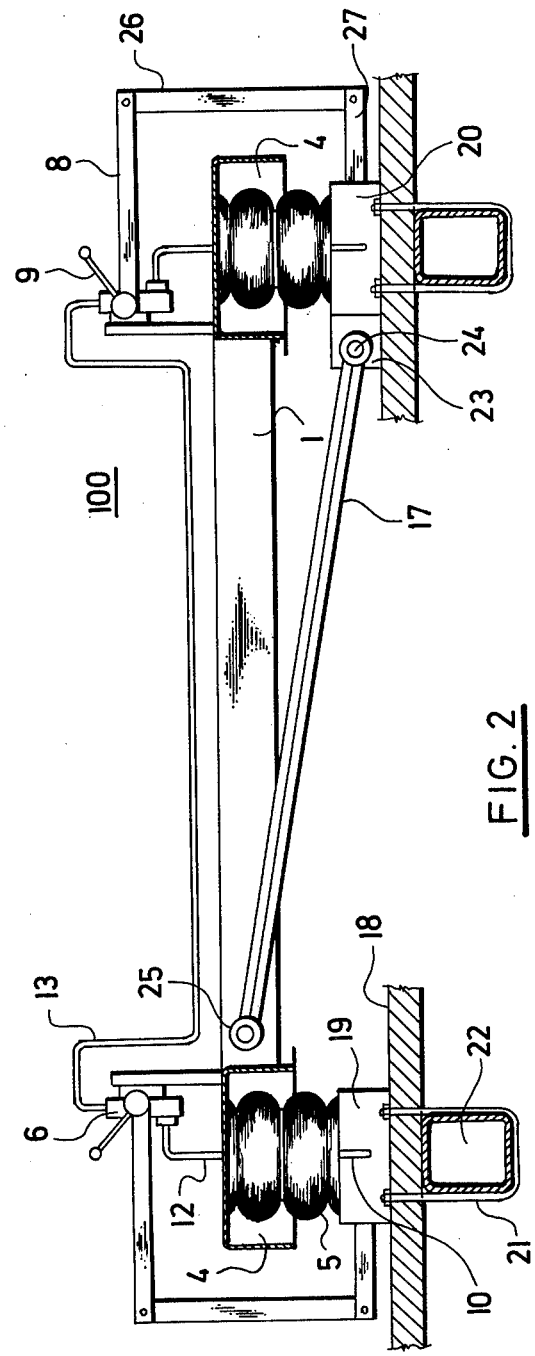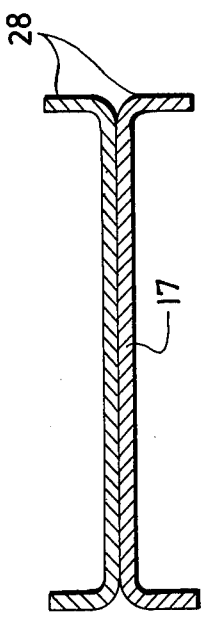

RESILIENT LOAD-BEARING SUPPORT FOR A VEHICLE

BACKGROUND OF THE INVENTION

This invention relates to apparatus for resiliently supporting machinery or other delicate loads on the floor of a movable vehicle.

Presently known methods of supporting portable printing presses and other delicate machinery on trucks and other vehicles generally employ anchor bolts that directly connect the frame of the machine to the floor of the vehicle. Under such circumstances, shocks, oscillations, and other disturbances imparted to the support floor of the vehicle, particularly during starting, braking, and travel of the vehicle over rough terrain, are transferred undiminished to the body of the machine, thereby often damaging it and reducing its reliability and operating life.

Additionally, it is often necessary to accurately orient a vehicle-mounted load in a predetermined position relative to the ground, i.e., a horizontal position, in order to assure safety and/or operating efficiency. In the past, the adjustment of the load into the required orientation has been time-consuming and clumsy, requiring the use of auxiliary support blocks, mechanical jacks, and the like. The use of such gross expedients, when carelessly done, has also tended to injure the structure and delicate components of certain types of loads.

SUMMARY OF THE INVENTION

The present invention provides an improved, position-controllable, resilient load-bearing support which may be associated with a vehicle floor or other carrier surface for substantially isolating delicate loads from shocks, vibrations and other forces imparted to the carrier surface during the movement of the vehicle.

In an illustrative embodiment, a stiff frame to which the load may be secured as by bolts is coupled to the vehicle support floor by a plurality of adjustable pneumatic springs, which are illustratively disposed at the corners of the frame. The spring-supported frame is mounted for pivotal movement about a predetermined point of the vehicle floor in a plane perpendicular to the direction of movement of the vehicle. Additionally, a steel rope or other flexible strand is wound around spaced anchor points on the stiff, spring-supported frame and on the vehicle floor to limit vertical displacements of the springs during vehicle travel.

The initial positioning of the stiff frame to a desired horizontal or other suitable position is accomplished by means of manual levers associated with a plurality of fluid control means that are individually associated with several of the springs at each corner of the frame. In this way, the positions of a plurality of points on the frame with respect to the vehicle support floor may be adjusted in accordance with the amount of fluid introduced into the associated spring. Once the desired orientation of the frame is set, it may be maintained by means of a servo arrangement including a tensioning control rod that is flexibly coupled between the fluid control means and the vehicle support floor.

A plurality of retractable, spring-loaded elongated spacers may be associated with each of the points of the frame in which a spring is disposed for maintaining the frame in a pre-set orientation and/or to establish a desired position of the frame with respect to the floor in the event that the fluid supply to the springs fails. In addition, a plurality of resilient support blocks may be attached to the underside of the above-mentioned support points of the frame in order to establish a minimum distance between the frame and the vehicle floor under all circumstances.

BRIEF DESCRIPTION OF THE DRAWING

The invention is further set forth in the following detailed description taken in conjunction with the appended drawing, in which:

FIG. 2 is a sectional view taken along line 2—2 of FIG. 1;

FIG. 6 is a transverse view in section of an oscillation arm suitable for use in the arrangement of FIG. 1.

DETAILED DESCRIPTION

Figure 1:
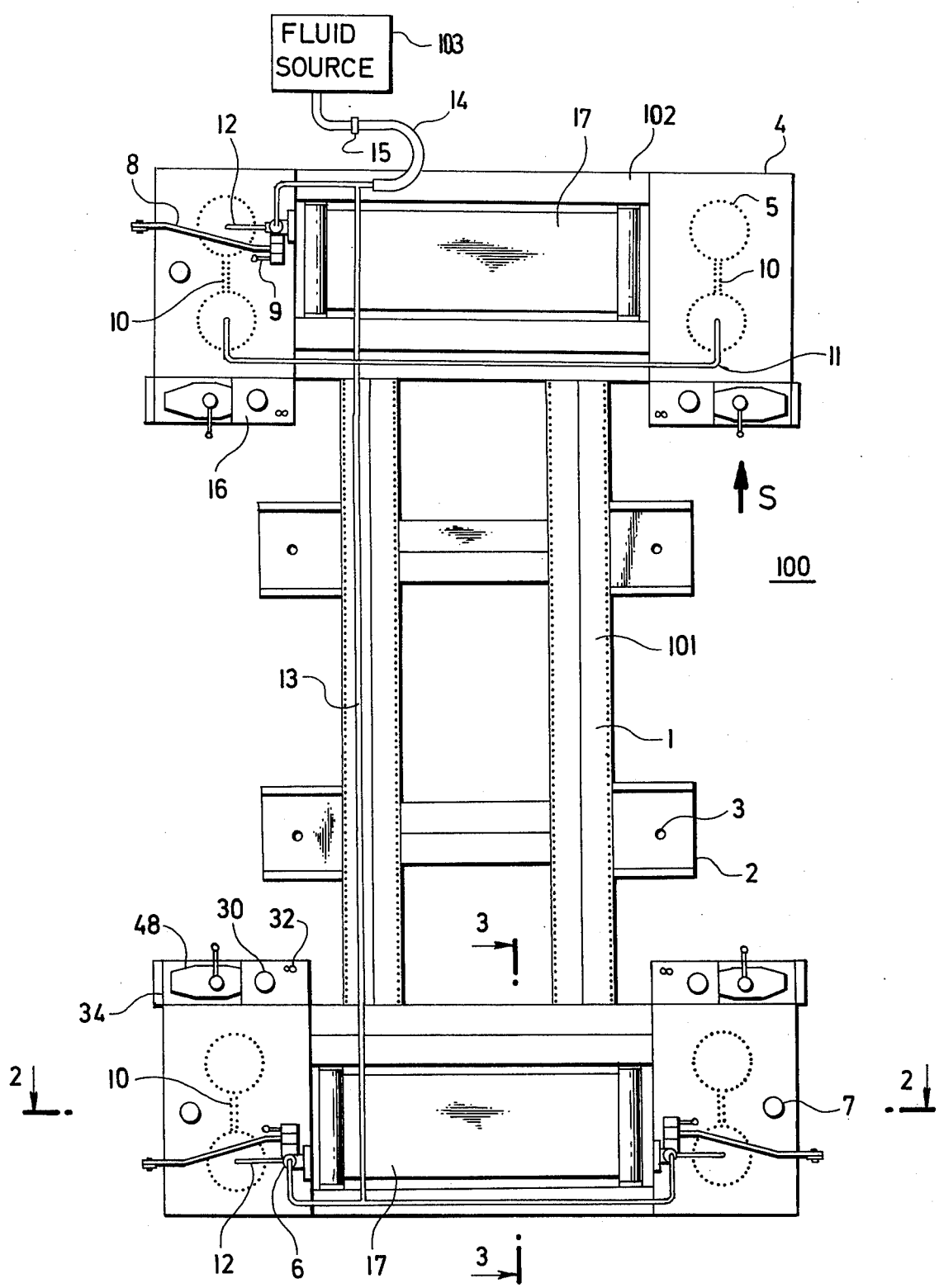
FIG. 1 is a plan view of a vehicle-mounted, resilient load-supporting arrangement constructed in accordance with the invention.
Figure 3:
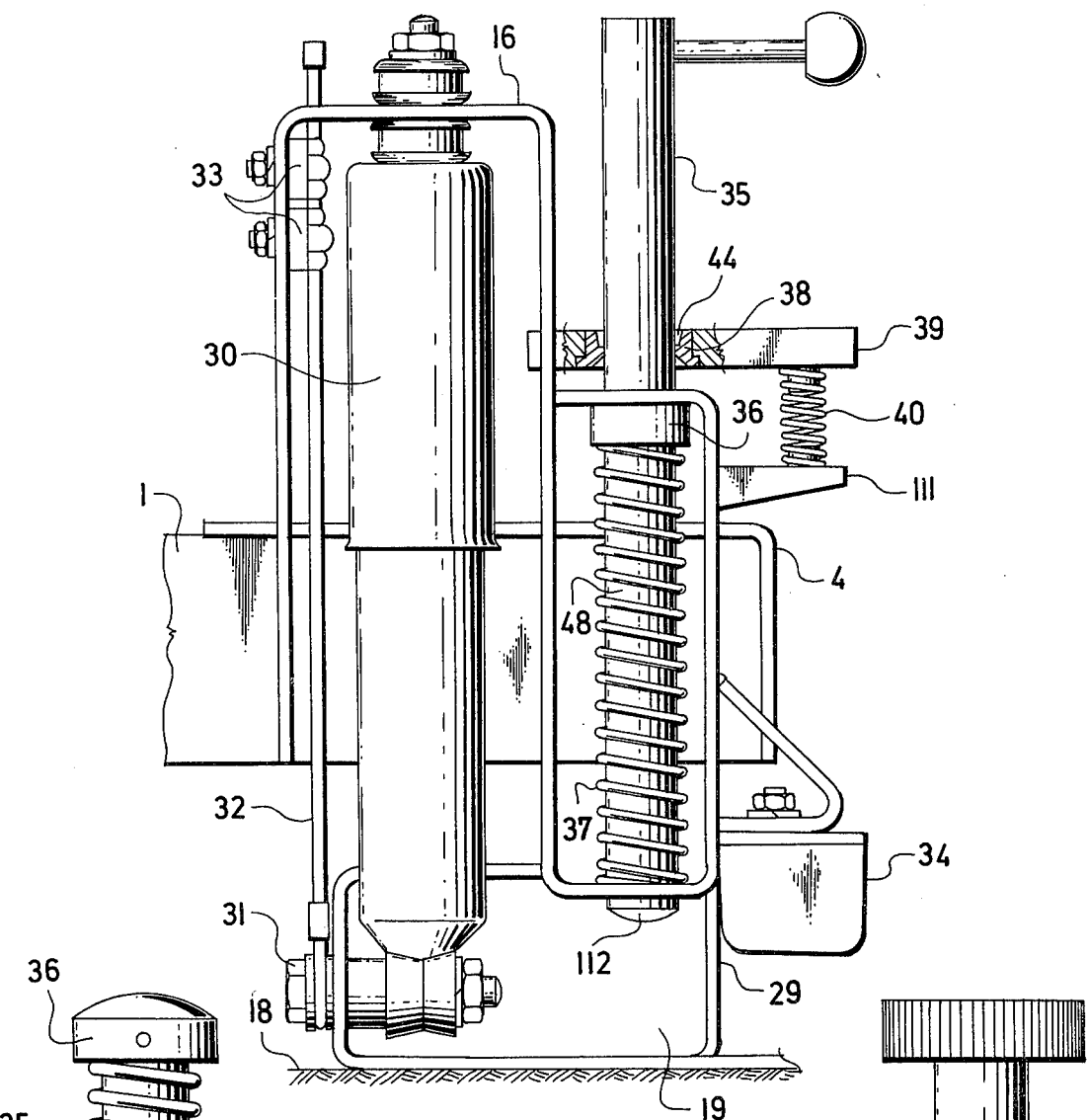
FIG. 3 is a sectional view taken along line 3—3 of FIG. 1, including a first embodiment of an adjustable spacer for separating the frame of FIG. 1 from the vehicle floor.

Referring first to FIGS. 1-3 of the drawing, a vehicle (not shown) on which a sensitive load is to be resiliently mounted is provided with a carrier member 22, on which is disposed a main vehicle support floor 18. A box member 19 is secured to the floor 18 by means of a U-shaped handle 21, which is secured by means of nuts within the box member 19.

Illustratively, four of the boxes 19 are provided in spaced relation on the floor 18 for mounting a resilient load-bearing support 100 constructed in accordance with the invention.

The arrangement 100 includes a stiff frame 1 to which are secured four brackets 2—2. Each of the brackets 2 has an anchor bolt hole 3 which mates with suitable apertures in the load (not shown) to be resiliently supported on the vehicle.

As shown best in FIG. 1, the frame 1 may include spaced longitudinal members 101—101 interconnected at their ends by cross-pieces 102—102. Each of the cross-pieces 102 has at its opposite ends downwardly opening box or channel members 4—4, which are respectively aligned with the four box members 19 (FIG. 2) on the vehicle floor 18. Illustratively, the longitudinal members 101 extend along the longitudinal axis of travel of the vehicle. Each of the corner members 4 carries an auxiliary support member 16, an advantageous configuration of which is shown in FIG. 3.

A plurality of adjustable pneumatic springs 5—5, which may illustratively be of the type employed in pneumatic shock absorbers for vehicles, extends between each of the corner vehicle box members 19 and the overlying corner member 4 of the frame 1. The springs 5 may be suitably affixed to the opposite members 4 and 19 by suitable screws (not shown). Illustratively, two of the springs 5 are provided at each of the four corners of the frame 1, although depending on the particular application one spring in each corner may suffice.

In order to adjust the vertical position of the individual springs 5—5, such springs may be supplied with fluid from a suitable fluid source 103 on the vehicle via a flexible hose 14 having a coupling member 15, and a plurality of tube members 10–13. In the arrangement illustrated whereby springs are provided at four spaced positions of the frame, three lever-controlled fluid regulation valves 6—6 are associated with three spring positions in the arrangement 100.

Each of the fluid regulation valves 6 (FIG. 2) has associated with it a first, transversely extending lever 8 which is coupled to the vehicle support box 19 by means of a tensioning link 26 and an auxiliary link 27. Additionally, a manual lever 9 is associated with each regulator 6 for setting a desired initial condition of fluid through the associated springs 5, and thereby adjusting the vertical position of the associated corner of the frame 1 with respect to the vehicle floor 18. Once such initial position is set, deviations from such position occurring during movement of the vehicle, particularly over rough terrain, will be reflected in movement of the tensioning rod 26, which serves as a detecting element and which correspondingly moves the lever 18. The latter, in turn, is arranged to suitably vary the amount of fluid flowing through the associated regulator valve 6 to maintain the associated springs, and thereby the adjacent corner of the frame, in the initially set position.

Thus, the frame 1 can be adjusted at three spaced points, i.e., the points associated with the control valve 6, into a horizontal or other desired position merely by operating the manual levers 9 of the associated valves 6, thereby adjusting the height of the springs 5 until the desired position is obtained. If such position is horizontal, its attainment can be exhibited by means of a plurality of spirit levels 7—7 individually associated with the valve-controlled springs 5—5. The spring-supported frame 1 is mounted for oscillation with respect to the support floor 18 of the vehicle by means of a pair of oscillation arms 17, which are disposed at opposite ends of the frame longitudinal members 101. Each of the oscillation arms 17 is illustratively formed by a pair of back-to-back channel members 28 (FIG. 6), interconnected along their central region 17. One end of each oscillation arm is connected to the frame 1 via a bolt 25, while the other end is connected to an extending portion 23 of the vehicle box member 19 by means of bolt 24. Each arm 17 is arranged to pivot the associated frame in a vertical plane perpendicular to the direction of longitudinal travel of the vehicle. The oscillatory movement of the frame 1 permitted by the arms 17 is limited by the use of an oscillation damper 30 (FIG. 3), which is embodied as a pair of telescoping cylinders. The lower cylinder of each oscillation damper is secured to a wall 29 of the vehicle box member 19 via a bolt 31, while the telescoped upper cylinder of the damper 30 is connected to the auxiliary support member 16 affixed to the associated corner member 4 of the frame 1. The use of the dampers 30 is especially advantageous during starting, stopping and braking of the vehicle, since at such times the oscillatory forces that would ordinarily operate on the vehicle-supported load is greatest.

In order to limit vertical displacements of the springs 5 and thereby the frame 1 caused by jarring and other impacts during travel of the vehicle over rough terrain, a movement limiter in the form of a strand 32 is provided. The strand 32, which may be embodied as a closed steel rope, extends around a pair of aligned anchor points on the box member 19 and the auxiliary support member 16 of the vehicle and frame, respectively. Illustratively, the vehicle anchor point may be associated with the bolt 31, while the frame anchor point may be embodied by a pair of threaded handles 33—33.

As an additional motion limiter, a resilient block 34 may be mounted in depending relation to the frame 1 and in particular to a portion of the auxiliary support member 16. Each such resilient block 34, in addition to limiting the compressive movement of the associated springs 5, is effective in establishing a minimum distance between the bottom of the frame 1 and the vehicle support surface 18.

A retractable, spring-loaded support rod 35 may also be provided as shown in FIG. 3 in order to help support the frame 1 in its position as adjusted initially by means of the mannual lever 18 of the associated control valve 6. The rod 35 extends through aligned apertures in a single-armed lever 39 and in spaced portions of the auxiliary support member 16 of the frame 1. A compression spring 48 is supported on the rod 35 intermediate a shoulder 36 and a bottom surface of the member 16.

The rod-receiving aperture (designated 44) in the lever 39 has a cross-section which may take the form of a double conical taper, as viewed in FIG. 3. With this arrangement, the outer peripheral surface of the rod may be held in a desired position by means of friction with an adjacent edge of the aperture 44 when the lever 39 is in an unoperated position. Such lever 39 has an inner end secured to one portion of the member 16, and an outer end connected by a second compression spring 40 to a projecting member 111 attached to an additional portion of the auxiliary member 16. Each of the rods 35 and the associated apparatus serves to maintain the relevant portion of the frame 1 in a position adjusted by the manual lever 9 of the associated regulation valve 6. For this purpose, the rod 35 is initially pushed downwardly against the force of the spring 48 until a bottom surface 112 there of contacts the vehicle support floor 18, or a member attached to it. The rod is held in such adjusted position by means of friction of its outer peripheral surface against the edge of the aperture 44. In order to release the rod 35 from its adjusted position, the outer end of the lever 39 is depressed against the force of its spring 40, so that the edge of the aperture 44 moves away from the peripheral surface of the rod 35 to permit such rod to be moved upwardly into its normal position by the force of its spring 48.

Figure 4:
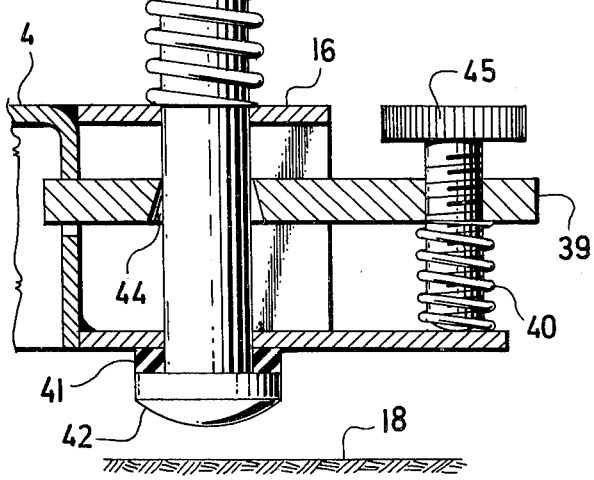
FIGS. 4 and 5 are respective alternative embodiments of the adjustable spacer of FIG. 3.

In the arrangement of FIG. 3, the portion of the lever 39 containing the aperture 44 may be embodied in a hardened steel insert 38. A plurality of such inserts 38 having different shaped apertures may be provided if desired; for example, an insert having a single conical taper in its aperture 44 can be substituted for the illustrated double conical taper. An example of such single conical taper is shown in the alternative pushrod arrangement of FIG. 4.

In such latter arrangement, the pushrod 35 has a pair of end flanges 36 and 42. A compression spring 37 has a first end supported on the flange 36, and a second end which is engageable with the top surface of the single-armed lever 39. As illustrated, the rod 35 is extendable through aligned apertures in the auxiliary member 16, and through the illustrated single-tapered aperture 44 in the lever 39.

In a manner analogous to that shown in FIG. 3, the outer end of the lever 39 is operable against a spring 40, a bolt member 45 being provided for this purpose.

The rod 35, as before, is displaceable downwardly against the force of the spring 37 until the lower end of the flange 42 contacts the vehicle support surface 18 or a suitable member attached thereto. In order to release the rod 35, the bolt member 45 is depressed to operate the lever 39 and thereby move the inner edge of the aperture 44 out of contact with the rod 35. Such rod will then move upwardly by virtue of the restoring force of the spring 37. In order to cushion shocks during such upward movement, a resilient spacer 41 is affixed to the top surface of the flange 42 for engagement with the bottom surface of the auxiliary member 16.

Figure 5:
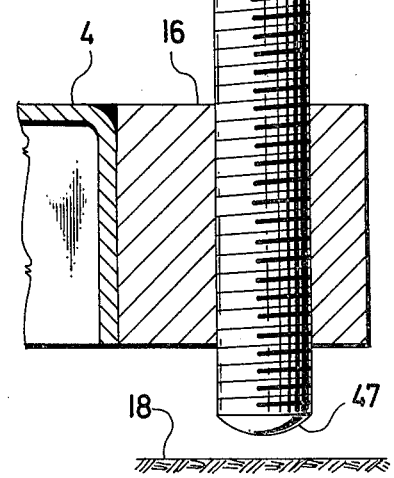

In the alternative arrangement shown in FIG. 5, the pushrod 35 has been replaced by a threaded rod 46, which extends through suitable threaded apertures in the auxiliary member 16. The rod 46 in operation is threaded in the member 16 until the bottom surface 47 is in contact with the support surface 18 or a member attached thereto.

In the foregoing, one illustrative embodiment of the invention has been described. Many variations and modifications will now occur to those skilled in the art. It is accordingly desired that the scope of the appended claims not be limited to the specific disclosure herein contained.

What is claimed is:

1. In a vehicle having a carrier surface, a position-controllable, load-bearing resilient support associated with the carrier surface and substantially isolated from forces imparted to the carrier surface during the movement of the vehicle, the support comprising, in combination, a stiff frame, a plurality of independently and externally adjustable pneumatic springs individually interconnecting spaced portions of the frame to respectively underlying portions of the carrier surface for maintaining each of said frame portions in a continually selectable vertical position relative to the underlying carrier surface portion in accordance with the amount of fluid in the springs, means coupled to the frame and operable independently of the springs for limiting vertical displacements of the springs during movement of the vehicle, and means including at least one arm extending between a first predetermined frame portion and the carrier surface portion underlying a second predetermined frame portion spaced from the first predetermined frame portion for oscillating the frame about the last-mentioned carrier surface portion.

2. A support as defined in claim 1, in which the oscillating means comprises means for pivoting the frame in a plane perpendicular to the direction of travel of the vehicle.

3. A support as defined in claim 1, further comprising a plurality of fluid control means associated with at least one less than the number of pneumatic springs for individually adjusting the amount of fluid contained in the last-mentioned number of springs.

4. A support as defined in claim 3, in which each fluid control means comprises means for manually setting the amount of fluid introduced into the associated spring.

5. A support as defined in claim 3, in which each fluid control means comprises detecting means responsive to displacements of the associated spring for varying the fluid flow to such spring.

6. A support as defined in claim 1, in which the displacement limiting means comprises, in combination, a first anchor point associated with the carrier surface, a second anchor point associated with the frame, and a closed strnd extending around the first and second anchor points.

7. A support as defined in claim 6, in which the displacement limiting means further comprises a plurality of resilient spacer blocks depending from the frame from maintaining a minimum distance between the frame and the carrier surface.

8. A support as defined in claim 1, further comprising a plurality of retractable spacer means independent of the pneumatic springs for initially maintaining the frame at a desired orientation with respect to the carrier surface.

9. A support as defined in claim 8, in which the retractable spacer means comprises, in combination, a lever having one end supported in a substantially horizontal position at one end of the frame and having a shaped aperture intermediate its ends, and elongated rod extendable downwardly thhrough the shaped aperture in the lever to a desired position in contact with the carrier surface, a spring supported on the rod for urging the rod in an upward direction, and tensioning means associated with the other end of the lever for frictionally holding the rod against the side of the shaped aperture against the force of the spring, the rod being released from the side of the shaped aperture when the other arm of the lever is depressed.

10. A support as defined in claim 9, in which the shaped aperture of the lever has at least one substantially conical radial taper.

* * * * *